United States Patent [19]

Schmid et al.

[11] Patent Number: 5,033,295

[45] Date of Patent: Jul. 23, 1991

[54] DEVICE FOR TRANSMISSION AND EVALUATION OF MEASUREMENT SIGNALS FOR THE TIRE PRESSURE OF MOTOR VEHICLES

[75] Inventors: Güter Schmid, Nürnberg; Michael Genzel; Gerhard Hettich, both of Rosstal, Fed. Rep. of Germany

[73] Assignee: Robert Bosch GmbH, Stuttgart, Fed. Rep. of Germany

[21] Appl. No.: 457,749

[22] PCT Filed: Feb. 4, 1989

[86] PCT No.: PCT/DE89/00073

§ 371 Date: Dec. 12, 1989

§ 102(e) Date: Dec. 12, 1989

[87] PCT Pub. No.: WO89/10851

PCT Pub. Date: Nov. 16, 1989

[30] Foreign Application Priority Data

May 4, 1988 [DE] Fed. Rep. of Germany ....... 3815114

[51] Int. Cl.$^5$ .............................................. B60C 23/02
[52] U.S. Cl. ................................... 73/146.5; 340/445; 340/448
[58] Field of Search ........................... 73/146.5, 146.4; 340/445, 447, 448, 442; 116/34 R; 200/61.22

[56] References Cited

U.S. PATENT DOCUMENTS 3,930,224 12/1975 Whiteing et al. ................. 73/146,5
4,130,817 12/1978 Hill et al. ............................ 340/448
4,334,428 6/1982 Fima et al. ......................... 340/448
4,389,884 6/1983 Agulia ............................... 73/146.5
4,761,996 8/1988 Schmid et al. ..................... 340/448

Primary Examiner—Joseph A. Orsino
Assistant Examiner—Brent Swarthout
Attorney, Agent, or Firm—Michael J. Striker

[57] ABSTRACT

In a device for the transmission and evaluation of measurement signals for the tire pressure of tubless tires mounted rims in single and twin wheels of motor vehicles which comprises a pressure sensor (6) arranged in the rim wall, which pressure sensor (6) is electrically connected with a signal transmitter coil (8) arranged at the rim (3), as well as a signal pick-up coil (20) of a high-frequency resonant circuit signal evaluating arrangement connected with the motor vehicle in the area of the axle so as to be stationary, it is provided for the purpose of enabling signal detection also when stationary and for problem-free application to twin tires, that a first repeater coil (15), which is electrically connected with a second repeater coil (17), is arranged in the area of the signal transmitter coil (8) at the hub (12) carrying the rim (3), which hub (12) is connected with the latter so as to be fixed with respect to rotation relative to it, wherein the second repeater coil (17) is constructed as a toroidal coil whose coil axis (18) coincides with the hub axis (11), wherein the stationary signal pick-up coil (20) is arranged in the magnetic field area of the second repeater coil (17).

6 Claims, 2 Drawing Sheets

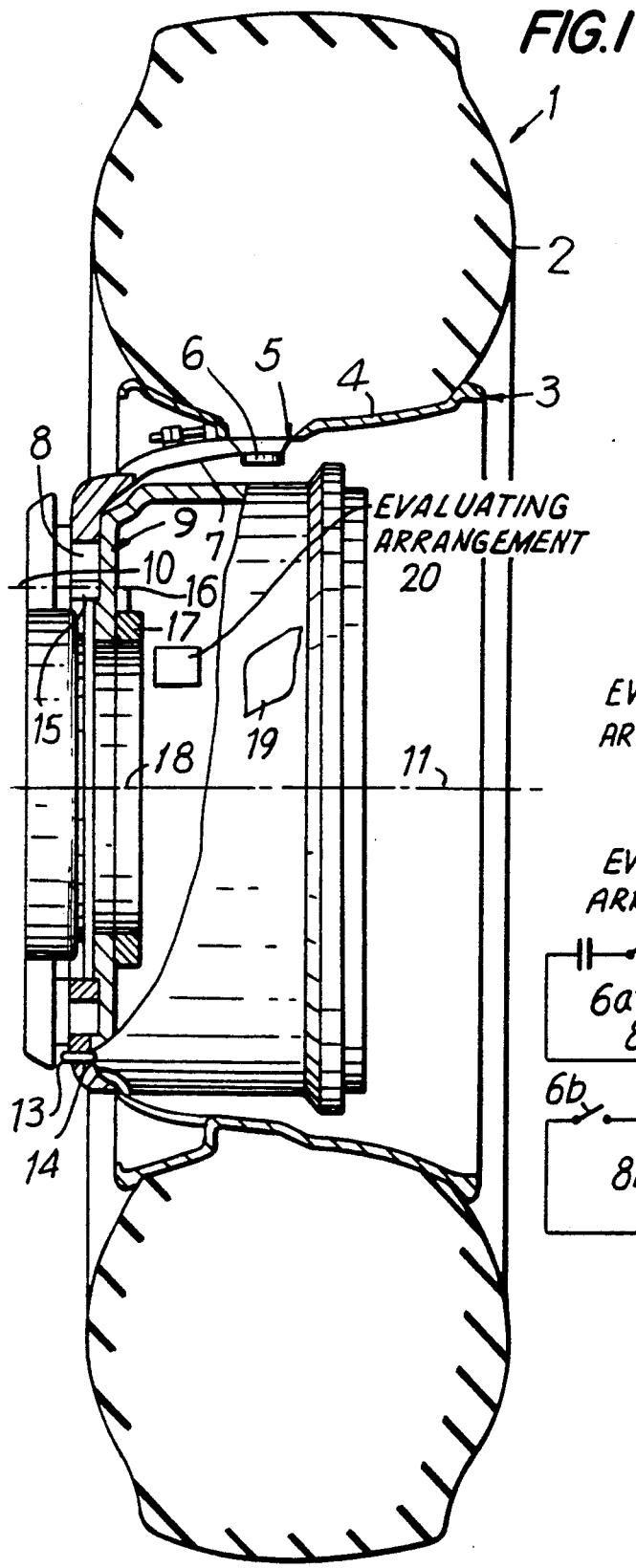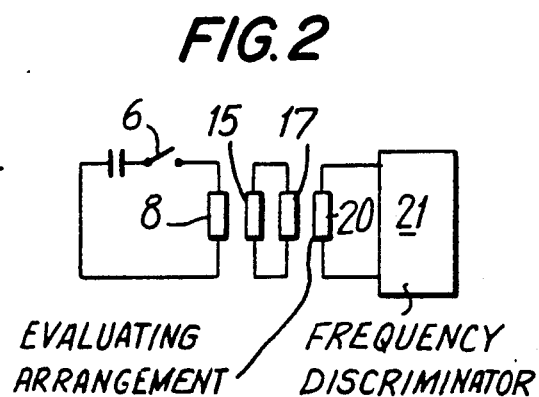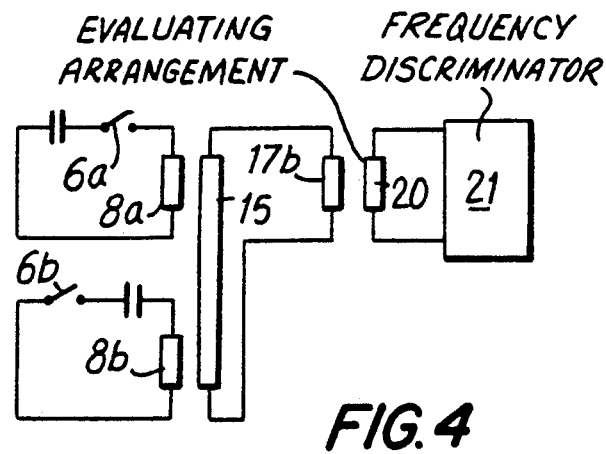

DEVICE FOR TRANSMISSION AND EVALUATION OF MEASUREMENT SIGNALS FOR THE TIRE PRESSURE OF MOTOR VEHICLES

BACKGROUND OF THE INVENTION

The invention relates to a device for transmission and evaluation of measurement signals for the tire pressure of tubeless tires mounted on rims in single and twin wheels of motor vehicles which device comprises a pressure sensor arranged in the rim wall and electrically connected with a signal transmitter coil arranged at the rim, as well as a high-frequency resonant circuit signal evaluation arrangement which comprises a signal pick-up coil and is connected with the motor vehicle in the area of the axle so as to be stationary.

Such a device is known, e.g., from DE-OS 35 41 529. The problem of achieving a signal transmission independent of exchanging of single wheels, was already solved in the previously known device. However, a signal transmission is not possible in the previously known device when the vehicle is stationary. But this is also of considerable importance in practical operation, since the vehicle driver should receive a warning signal already before starting to drive if the tire pressure is no longer at the required level after a pause in driving.

SUMMARY OF THE INVENTION

The object of the invention is a device of the type mentioned in which a pressure signal transmission is simple in terms of design, is reliable and can also be achieved in the rest state in both single and twin tires.

This object is achieved, according to the invention, in that a first repeater coil, which is electrically connected with a second repeater coil, is arranged in the area of the signal transmitter coil at the hub carrying the rim, which hub is connected with the latter so as to be fixed with respect to rotation relative to it, and the second repeater coil is constructed as a toroidal coil whose coil axis lies in the hub axis, and wherein the signal pick-up coil of the stationary high-frequency resonant circuit signal evaluating arrangement is arranged in the magnetic field area of the second repeater coil.

The arrangement and construction of the second repeater coil ensures that a measurement signal is not only transmitted from the sensor to the evaluating arrangement in predetermined angular positions, and accordingly only during the rotation of the wheel, but rather that a continuous measurement signal transmission is ensured, since the signal transmitter coil and the first repeater coil are not rotated relative to one another, and the second repeater coil can transmit signals to the evaluating arrangement regardless of its angular position. Only the evaluating arrangement or the high-frequency transmitter and receiver parts of the evaluating arrangement, respectively, need be magnetically coupled with the repeater coil.

In a further development of the invention, it is provided that the signal transmitter coil and the first repeater coil are arranged in the area of the rim cup base. In this area, the rim is mechanically connected with the hub in a conventional manner by screws, so that the narrow spatial proximity of the two coils which is desirable for a reliable transmission from the signal transmitter coil to the first repeater coil, can also be realized in this area.

It is provided in an advantageous manner that mechanical catch devices are arranged at the rim or at the hub in such a way that the rim can be mounted only in a predetermined angular position relative to the hub in each instance. This ensures that the signal transmitter coil and the first repeater coil are arranged so as to be spatially adjacent to one another, preferably opposite one another, when the rim is mounted on the hub, even if this is done by untrained or inattentive persons. Usually, a pin and a hole are already provided at the hub and rim in order to align the holes of the rim with the threaded holes of the hub for the insertion of screws when mounting the rim. Accordingly, in order to realize a mechanical catch device, according to the invention, e.g., only a second pin of this type with a corresponding hole need be provided, so that the rim can be mounted in only one predetermined angular position. Alternatively, when only one pin is provided at the hub or at the rim, only one bore hole fitting the latter need be provided.

In order that the device, according to the invention, can also be used with twin tires, it is provided that the signal transmitter coils of the inner and outer wheel are aligned with the first repeater coil arranged at the hub and thus form a magnetically coupled system. In this way, a transmission of the signals of the signal transmitter coil of the outer and inner twin wheels to the first repeater coil and subsequently to the second repeater coil and, accordingly, also to the evaluating arrangement is made possible. Because of the construction design of the device, according to the invention, a single wheel and a twin wheel can be exchanged with one another and monitored.

It is also provided, in an advantageous manner, that the evaluating device comprises a discriminator arrangement for distinguishing between at least three different frequency levels and for transmitting corresponding output signals. These three different frequency levels are adjusted as a function of whether only one or both of the pressure sensors, which are constructed e.g. as pressure switches, responds or whether none of the pressure switches is switched on. The different frequencies occurring when one or two pressure switches are switched on, result in that the impedance at the first repeater coil changes when the pressure sensors respond, which leads to a change in the resonant frequency by detuning the resonant circuit.

The present invention as to its construction so to its mode of operation, together with additional objects and advantages thereof, will be best understood from the following description of a preferred embodiment with reference to the drawing.

BRIEF DESCRIPTION OF THE DRAWINGS

FIG. 1 shows a schematic sectional view of a single wheel of a motor vehicle comprising a device according to the invention;

FIG. 2 shows a schematic wiring diagram of the arrangement shown in FIG. 1;

FIG. 4 shows a schematic electrical circuit arrangement corresponding to the device shown in FIG. 3.

DESCRIPTION OF THE PREFERRED EMBODIMENT

Figure 3:
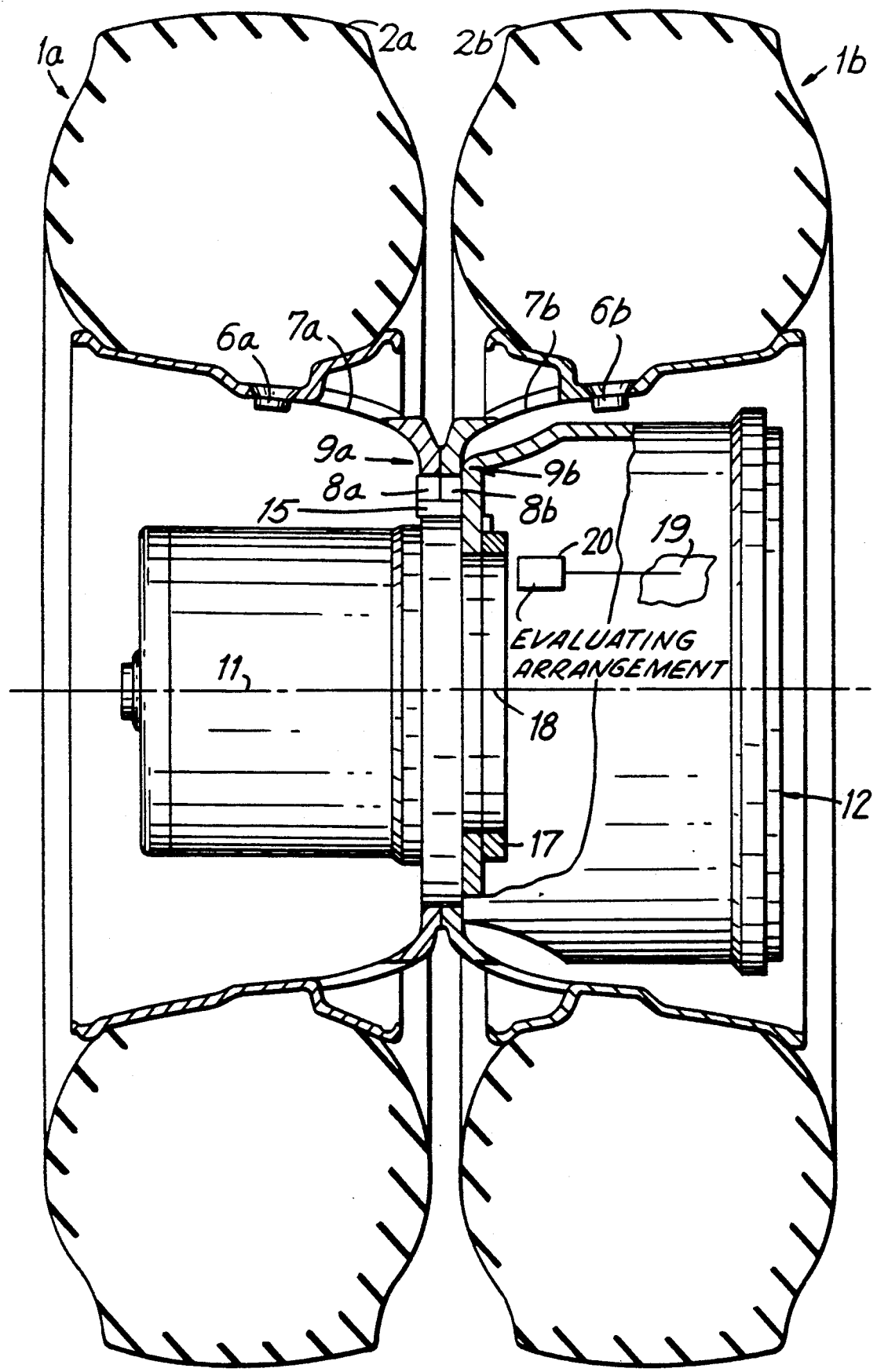
FIG. 3 shows a schematic sectional view of a device, according to the invention, at a twin wheel.

FIG. 1 shows a wheel of a motor vehicle, particularly a truck. The wheel 1 comprises a tubeless tire 2 which is mounted on a rim 3. A pressure sensor 6, which is a pressure-dependent switch in the simplest case, is inserted in the rim wall 4 so as to penetrate a recess 5 provided in the latter; the pressure sensor 6 opens as soon as the air pressure in the tire 2 falls below a limiting value. This pressure sensor 6 is electrically connected with a signal transmitter coil 8 via a high-grade steel conduit 7.

A pin 13, which engages in only one single corresponding hole 14 at the rim cup base 9, is provided at the hub 12 in order to achieve mounting of the rim 3 in a predetermined angular position relative to the hub 12.

Accordingly, it is ensured that the signal transmitter coil 8, which is constructed with a U-shaped core directed toward the hub 12, rests directly above a first repeater coil 15 which is arranged at the hub 12 and comprises a U-core correspondingly directed toward the rim 3, the signal transmitter coil 8 being arranged in such a way that the axis 10 of symmetry of its core extends parallel to the longitudinal axis 11 of the hub 12. The first repeater coil 15 is connected via a conductor 16 with a second repeater coil 17 constructed as a toroidal coil. The second repeater coil 17 has an axis 18 which coincides with the axis 11 of the hub 12.

The evaluating arrangement 20, i.e. at least one high-frequency receiver coil of the evaluating arrangement 20, is fastened at a wheel suspension or axle 19, respectively, which is fixed with respect to rotation and supports the hub 12 so that the latter is rotatable, which wheel suspension is constructed in a conventional manner and is therefore only shown schematically. This high-frequency receiver coil is arranged in the circumferential area of the toroidal second repeater coil 17 and is magnetically coupled with it. A signal discriminator arrangement 21 is connected subsequent to the receiver coil 20 or is integrated in the latter.

It is clear from FIG. 2 that the high-frequency resonant circuit is detuned as a function of the opening or closing of the pressure sensor 6 constructed as a pressure switch, so that an output signal, "tire pressure normal" or "tire pressure low", can be transmitted depending on the occurring frequency level of the discriminator arrangement 21.

Two wheels 1 corresponding to FIG. 1 are combined in FIG. 3 to form a so-called twin tire. The structural component parts corresponding to FIG. 1 are designated by the same reference numeral 15 in FIG. 3, wherein the parts designated by "a" belong to the twin tire running on the outside and the parts designated by "b" belong to the twin tire running on the inside.

It can be seen from the view in FIG. 3 that, when the rim cup bases 9a and 9b, respectively, of the tires 1a and 1b, respectively, contact one another, the coils lie immediately adjacent to one another and are magnetically coupled with a first repeater coil 15 which is arranged at the hub 11 and is accordingly twice as wide, so that signals of the pressure sensor 6a can also be transmitted from the wheel 1a via the signal transmitter coil 8a through the first repeater coil 15 to the respective second repeater coil 17 and the evaluating arrangement 20.

As can be seen from FIG. 4, different impedances result at the wheels depending on whether the pressure switch of the sensor 6a is closed or the pressure sensor of sensor 6b is closed or whether both are open or closed. Different frequency levels and resonant frequencies result from this, so that the frequency discriminator 21 can transmit different output signals depending on the detuning of the resonant circuit of the evaluating arrangement 20, which output signals make possible a warning indication when the tire pressure in one or both tires falls below the reference value.

It is also clear from the above description, particularly from FIG. 3, that the device, according to the invention, is protected from any manipulation from the outside, since all device parts lie in the interior of the rim cups.

We claim:

1. A device for transmitting and evaluating measurement signals of tire pressure in single and twin wheels of motor vehicles with each wheel including a hub having a hub axis, a rim supported on the hub for joint rotation therewith, and a tubeless tire mounted on the rim, said device comprising a sensor arranged in a rim wall; a signal transmitter coil arranged at the rim; first conductor means for electrically connecting a pressure sensor with said signal transmitter coil; high-frequency resonant circuit signal evaluating means located in vicinity of an axle of a motor vehicle, fixed stationary with respect to the motor vehicle, and including a signal pick-up coil; a first repeater coil arranged on the hub in an area of said signal transmitting coil; a second repeated coil; second conductor means for electrically connecting said first and second repeater coils, said second repeater coil being formed as a toroidal coil having an axis that coincides with the hub axis, said signal pick-up coil being arranged in a magnetic field of said second repeater coil; and means for enabling mounting of the rim in a predetermined angular position on the hub in which said signal transmitter coil and said first repeater coil are located opposite each other.

2. A device for transmitting and evaluating measurement signals of tire pressure in twin wheels of motor vehicles with each wheel including a hub having a hub axis, a rim supported on the hub for joint rotation therewith, and a tubeless tire mounted on the rim, said device comprising a sensor arranged in a rim wall; two signal transmitter coils arranged at the respective rim walls so as to be adjacent to each other; first conductor means for electrically connecting a pressure sensor with said signal transmitter coils; high-frequency resonant circuit signal evaluating means located in vicinity of an axle of a motor vehicle, fixed stationary with respect to the motor vehicle, and including a signal pick-up coil; a common first repeater coil arranged on the hub opposite to said two signal transmitting coils; a second repeater coil; second conductor means for electrically connecting said first and second repeater coils, said second repeater coil being formed as a toroidal coil having an axis that coincides with the hub axis, said signal pick-up coil being arranged in a magnetic field of said second repeater coil, each of said signal transmitter coil and said first repeater coil having an axis extending parallel with respect to the hub axis, and an end surface which is aligned with an opposite end surface of another of said signal transmitter coil and said first repeater coil, said two transmitter coils being magnetically coupled with said common first repeater coil.

3. A device according to claim 1, wherein said means for enabling mounting of the rim in a predetermined angular position are formed as catch means.

4. A device according to claim 1, wherein the rim comprises a rim cup base, said signal transmitter coil and said first repeater coil being located in an area of the rim cup base.

5. A device according to claim 1, wherein each of said signal transmitter coil and said first repeater coil has an axis extending parallel with respect to the hub axis, and an end surface which is aligned with an opposite end surface of another of said signal transmitter coil and said first repeater coil.

6. A device according to claim 1, wherein said high-frequency resonant circuit signal evaluating means includes discriminator means for distinguishing at least between three different frequency levels and for generating respective output signals.

* * * * *